(12) United States Patent
Miyake et al.

(10) Patent No.: US 11,034,138 B2
(45) Date of Patent: Jun. 15, 2021

(54) COATED FILMS AND PACKAGES FORMED FROM SAME

(71) Applicants: Dow Global Technologies LLC, Midland, MI (US); Rohm and Haas Company, Collegeville, PA (US)

(72) Inventors: Kevin K. Miyake, Ringwood, IL (US); Jorge C. Gomes, Sao Paulo (BR); Larry Jopko, Lake Jackson, TX (US); Nicolas C. Mazzola, Jundiai (BR); Juan Carlos Casarrubias, Mexico City (MX); Claudia Hernandez, Freeport, TX (US); Mateus Cipro, Sao Paulo (BR); Jie Wu, Lake Jackson, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 128 days.

(21) Appl. No.: 15/564,096

(22) PCT Filed: May 26, 2016

(86) PCT No.: PCT/US2016/034265
§ 371 (c)(1),
(2) Date: Oct. 3, 2017

(87) PCT Pub. No.: WO2016/196168
PCT Pub. Date: Dec. 8, 2016

(65) Prior Publication Data
US 2018/0079880 A1   Mar. 22, 2018

Related U.S. Application Data

(60) Provisional application No. 62/167,983, filed on May 29, 2015.

(51) Int. Cl.
B32B 7/02 (2019.01)
B32B 27/08 (2006.01)
(Continued)

(52) U.S. Cl.
CPC ............... B32B 27/08 (2013.01); B32B 27/32 (2013.01); C08G 18/10 (2013.01);
(Continued)

(58) Field of Classification Search
CPC ... B32B 27/08; B32B 2250/242; B32B 27/32; B32B 2255/26; B32B 2255/10;
(Continued)

(56) References Cited

U.S. PATENT DOCUMENTS 5,191,052 A * 3/1993 Welborn, Jr. ........... C08F 10/00
526/160
5,254,394 A * 10/1993 Bothe ..................... B32B 27/32
428/212

(Continued)

FOREIGN PATENT DOCUMENTS

CA   969820 A    6/1975
EP   2730403 A1  5/2014
(Continued)

OTHER PUBLICATIONS

Mira-Glos and Mor-Gloss UV Curable Coatings, EB, Curable Coatings, Sovent-Based Two Component Polyurethane Coatings, or Waterborne Acrylic Coatings, Product Safety Assessment, The Dow Chemical Company, Feb. 4, 2014.
(Continued)

*Primary Examiner* — Zachary M Davis

(57) ABSTRACT

The present invention provides coated films and packages formed from such films. In one aspect, a coated film comprises (a) a film comprising (i) a first layer as described herein; (ii) a second layer as described herein; and (iii) at
(Continued)

least one inner layer between the first layer and the second layer as described herein; and (b) a coating on an outer surface of the second layer of the film comprising polyurethane.

13 Claims, 3 Drawing Sheets

(51) Int. Cl.
| | | |
|---|---|---|
| *B32B 27/32* | (2006.01) | |
| *C08J 7/04* | (2020.01) | |
| *C08J 7/043* | (2020.01) | |
| *C08J 7/052* | (2020.01) | |
| *C08G 18/10* | (2006.01) | |
| *C08G 18/18* | (2006.01) | |
| *C08G 18/48* | (2006.01) | |
| *C08G 18/76* | (2006.01) | |

(52) U.S. Cl.
CPC ..... *C08G 18/1825* (2013.01); *C08G 18/4812* (2013.01); *C08G 18/4825* (2013.01); *C08G 18/4829* (2013.01); *C08G 18/7621* (2013.01); *C08J 7/043* (2020.01); *C08J 7/0427* (2020.01); *C08J 7/052* (2020.01); *B32B 2250/24* (2013.01); *B32B 2250/242* (2013.01); *B32B 2255/10* (2013.01); *B32B 2255/26* (2013.01); *B32B 2270/00* (2013.01); *B32B 2307/306* (2013.01); *B32B 2307/7242* (2013.01); *B32B 2439/46* (2013.01); *C08J 2323/04* (2013.01); *C08J 2475/04* (2013.01)

(58) Field of Classification Search
CPC ............ B32B 18/4812; B32B 18/4825; B32B 18/4829; C09D 175/04; C09D 175/06; C09D 175/08; Y10T 428/31587
USPC ...................................... 428/424.8
See application file for complete search history.

(56) References Cited

U.S. PATENT DOCUMENTS

| | | | |
|---|---|---|---|
| 6,027,776 | A | 2/2000 | Mueller |
| 6,383,644 | B2 | 5/2002 | Fuchs |
| 6,528,127 | B1 | 3/2003 | Edlein et al. |
| 6,642,343 | B2 | 11/2003 | Gilles et al. |
| 7,063,882 | B2 | 6/2006 | Mossbrook et al. |
| 8,133,560 | B2 | 3/2012 | Schaefer et al. |
| 9,061,536 | B2 | 6/2015 | Wiegers |
| 2002/0156227 | A1 | 10/2002 | Gilles et al. |
| 2003/0180541 | A1 | 9/2003 | Naik et al. |
| 2004/0062919 | A1 | 4/2004 | Kuchenmeister et al. |
| 2004/0115457 | A1* | 6/2004 | Kong ................. B32B 7/06 428/515 |
| 2008/0057238 | A1 | 3/2008 | Follestad et al. |
| 2012/0010060 | A1 | 1/2012 | Fenn-Barrabass et al. |
| 2012/0033901 | A1 | 2/2012 | Votaw |
| 2013/0074457 | A1 | 3/2013 | Brown et al. |
| 2013/0092590 | A1 | 4/2013 | Bellini et al. |
| 2014/0127489 | A1 | 5/2014 | Pavlik |
| 2016/0115285 | A1* | 4/2016 | Gao ................. C08L 23/08 428/220 |

FOREIGN PATENT DOCUMENTS

| | | |
|---|---|---|
| IN | 201303634 | 2/2014 |
| JP | 2002052669 A | 2/2002 |
| JP | 2002178462 A | 6/2002 |
| JP | 2005309052 A | 11/2005 |
| WO | 2012/055899 A1 | 5/2012 |

OTHER PUBLICATIONS

Mira-Glos RT A&C, Adhesives and Sealants, Rohm and Haas, Apr. 2004.
PCT/US2016/034265, International Search Report dated Dec. 8, 2016.
PCT/US2016/034265, Written Opinion of the International Search Authority dated Dec. 8, 2016.
PCT/US2016/034265, International Preliminary Report on Patentability dated Dec. 5, 2017.

* cited by examiner

FIG. 3

| Samples | Without Teflon | With Teflon | With Teflon | | | | | |
|---|---|---|---|---|---|---|---|---|
| Temp, 40 psi, 0.5 sec | PE alone | PE alone | PE+PU coat 1.5 gsm | PE+PU coat 3 gsm | PE+PU coat 7 gsm | PE+PU coat 1.5 gsm | PE+PU coat 3 gsm | PE+PU coat 7 gsm |
| A | | | | | | | | |
| 120°C | | | | | | | | |
| 130°C | | | | | | | | |
| 140°C | | | | | | | | |
| 150°C | | | | | | | | |
| 160°C | | | | | | | | |
| 170°C | | | | | | | | |
| 180°C | | | | | | | | |
| 190°C | | | | | | | | |

▭ Operating window PE+PU coat
▩ PE melts and it is cutted and or elongated

FIG. 4

| Samples | Without Teflon | PE alone +Teflon | Without Teflon | | | Using Teflon | | |
|---|---|---|---|---|---|---|---|---|
| Temp, 40 psi, 0.5 sec | PE alone | | PE+PU coat 1.5 gsm | PE+PU coat 3 gsm | PE+PU coat 7 gsm | PE+PU coat 1.5 gsm | PE+PU coat 3 gsm | PE+PU coat 7 gsm |
| 120°C | | | | | | | | |
| 130°C | | | | | | | | |
| 140°C | | | | | | | | |
| 150°C | | | | | | | | |
| 160°C | | | | | | | | |
| 170°C | | | | | | | | |
| 180°C | | | | | | | | |
| 190°C | | | | | | | | |

▭ Operating window PE+miraglos
▩ PE melts and it is cutted and or elongated

COATED FILMS AND PACKAGES FORMED FROM SAME

FIELD

The present invention relates to coated films that can be used in packages. Such coated films can be particularly useful in food packages such as stand-up pouches.

INTRODUCTION

For years, many types of flexible and semi-rigid packaging created to protect food, liquids, personal care items, and other consumer products have been manufactured with a structure that typically combines polyester and/or polypropylene layer(s) with polyethylene films using reactive polyurethane adhesive to make a laminate of the various layers. The same type of lamination may also be made using extrusion or thermal lamination techniques using various polyolefin extrudate or other thermally active polymers. Such film structures combine the gloss, stiffness, thermal resistance, and oxygen barrier properties of polyester and/or polypropylene layers with the water vapor barrier, mechanical, and sealing properties of polyethylene layers. In addition, some packages include metal foil layers, paperboard layers, and other layers. Of course, the barrier properties (resistance (or lack of resistance) to oxygen and water vapor transmission) can be selected based on the type of product to be packaged through the selection of individual layers of the final package.

While such packages combine a number of properties, one of the primary challenges of such packages is the many conversion and fabrication steps that can be required to manufacture the package. Another challenge with such mixed material packages is the disposal of such packages. With such packages being made up of mixed plastics and/or metal foils and/or paperboard, the packages are usually discarded as waste due to the incompatibility for recycling of these materials, though thermal energy recovery may be an option through incineration and heat recovery.

It would thus be desirable to have new coated films and related materials for use in packages that provide necessary properties and function and allow ease of recycling or thermal energy recovery.

SUMMARY

The present invention provides coated films that advantageously combine polyolefin-based films (including monolayer and multi-layer films, with and without lamination) with a polyurethane coating that advantageously provide desirable properties with an improved compatibility/recyclability profile. In some embodiments, the present invention provides coated films for packages that have sealing temperature ranges and gloss that are comparable to polyester or polypropylene-based films but that can be produced in simplified manufacturing processes. For example, in some embodiments, the polyurethane coating can be applied to an outer surface of a polyolefin-based film in-line (e.g., following extrusion) to provide the coated films. In some embodiments, the present invention advantageously simplifies film production processes for packaging and minimizes the use of incompatible materials that cause difficulties in recycling.

In one aspect, the present invention provides a coated film that comprises (a) a film comprising (i) a first layer comprising from 70 to 100 percent by weight of a linear low density polyethylene having a density less than 0.930 g/cm$^3$ and a peak melting point of less than 126° C.; (ii) a second layer comprising from 60 to 100 percent by weight polyethylene having a density of 0.905 to 0.970 g/cm$^3$ and a peak melting point in the range of 100° C. to 135° C.; and (iii) at least one inner layer between the first layer and the second layer comprising from 40 to 100 percent by weight of a high density polyethylene having a density from 0.930 to 0.970 g/cm$^3$ and a peak melting point in the range of 120° C. to 135° C.; and (b) a coating on an outer surface of the second layer of the film comprising polyurethane. In some embodiments, the coated film is thermally resistant under the sealing conditions of ASTM F1921-98 over a temperature range of 80° C. to 180° C., and/or has a gloss of at least 70 units at 60°. In some embodiments, the first layer is a sealing layer.

In another aspect, the present invention provides a coated film that comprises (a) a monolayer film comprising from 70 to 100 percent by weight polyethylene having a density less than 0.930 g/cm$^3$ and a melt index ($I_2$) of less than 2.0 g/10 minutes, and a peak melting point of less than 126° C.; and (b) a coating on an outer surface of the film comprising polyurethane. In some embodiments, the coated film is thermally resistant under the sealing conditions of ASTM F1921-98 over a temperature range of 80° C. to 180° C., and/or has a gloss of at least 70 units at 60°. Such temperature ranges can facilitate the use of such coated films in form fill and seal packaging processes with minimal detriment on productivity.

Embodiments of the present invention also provide articles (e.g., flexible packages, pouches, stand-up pouches, bags, etc.) formed from the coated films disclosed herein.

These and other embodiments are described in more detail in the Detailed Description.

BRIEF DESCRIPTION OF THE DRAWINGS

FIG. 3 is a chart showing the results of thermal resistance tests with traction in the Examples.

FIG. 4 is a chart showing the results of thermal resistance tests without traction in the Examples.

DETAILED DESCRIPTION

Figure 1:
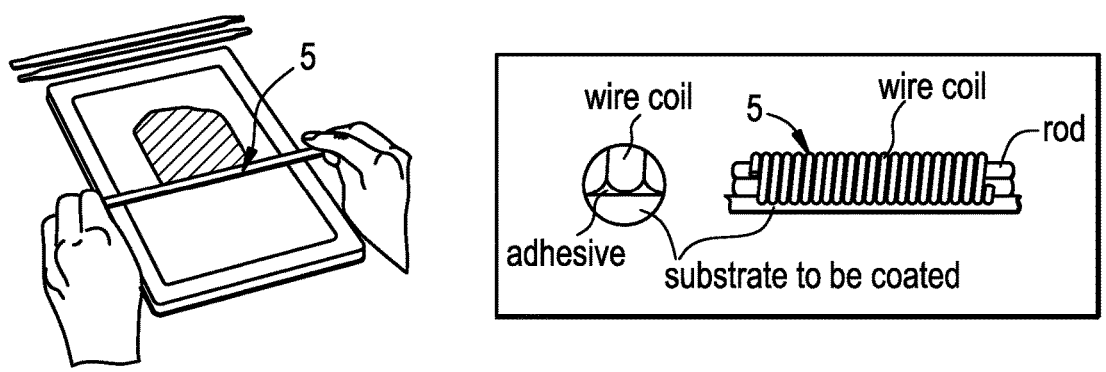
FIG. 1 illustrates the application of a coating to a film.

Unless specified otherwise herein, percentages are weight percentages (wt %) and temperatures are in ° C.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

"Polyethylene" shall mean polymers comprising greater than 50% by weight of units which have been derived from ethylene monomer. This includes polyethylene homopolymers or copolymers (meaning units derived from two or more comonomers).

Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.940 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art, with gas and slurry phase reactors being most preferred. LLDPEs typically can have a density up to 0.940 g/cm$^3$, and can include ULDPE and VLDPE which are LLDPEs having densities at the lower end of the range.

The term "MDPE" refers to polyethylenes having densities from 0.926 to 0.940 g/cm$^3$. "MDPE" is typically made using chromium or Ziegler-Natta catalysts or using metallocene, constrained geometry, or single site catalysts, and typically have a molecular weight distribution ("MWD") greater than 2.5.

The term "HDPE" refers to polyethylenes having densities of about 0.940 g/cm$^3$ or greater, which are generally prepared with Ziegler-Natta catalysts, chrome catalysts or even metallocene catalysts.

"Polypropylene" shall mean polymers comprising greater than 50% by weight of units which have been derived from propylene monomer. This includes polypropylene homopolymers or copolymers (meaning units derived from two or more comonomers). Common forms of polypropylene known in the art include homopolymer polypropylene (hPP), random copolymer polypropylene (rcPP), impact copolymer polypropylene (hP+at least one elastomeric impact modifier) (ICPP) or high impact polypropylene (HUT), high melt strength polypropylene (HMS-PP), isotactic polypropylene (iPP), syndiotactic polypropylene (sPP), and combinations thereof.

"Multimodal" means resin compositions which can be characterized by having at least two distinct peaks in a GPC chromatogram showing the molecular weight distribution. Multimodal includes resins having two peaks as well as resins having more than two peaks.

Unless otherwise indicated herein, the following analytical methods are used in the describing aspects of the present invention:

Melt index: Melt indices $I_2$ (or I2) and $I_{10}$ (or I10) are measured in accordance to ASTM D-1238 at 190° C. and at 2.16 kg and 10 kg load, respectively. Their values are reported in g/10 min. "Melt flow rate" is used for polypropylene based resins, and other resins, and determined according to ASTM D1238 (230° C. at 2.16 kg).

Density: Samples for density measurement are prepared according to ASTM D4703. Measurements are made, according to ASTM D792, Method B, within one hour of sample pressing.

Peak melting point is determined by Differential Scanning calorimeter (DSC) where the film is conditioned at 230° C. for 3 minutes prior to cooling at a rate of 10° C. per minute to a temperature of −40° C. After the film is kept at −40° C. for 3 minutes, the film is heated to 200° C. at a rate of 10° C. per minute.

The term molecular weight distribution or "MWD" is defined as the ratio of weight average molecular weight to number average molecular weight ($M_w/M_n$). $M_w$ and $M_n$ are determined according to methods known in the art using conventional gel permeation chromatography (conventional GPC).

Gloss is determined according to ASTM D2457.

Thermal resistance was measured according to ASTM F1921-98 as described further below.

Coefficient of Friction is determined according to ASTM 1894.

Additional properties and test methods are described further herein.

In one aspect, the present invention provides a coated film that comprises (a) a film comprising (i) a first layer comprising from 70 to 100 percent by weight of a linear low density polyethylene having a density less than 0.930 g/cm³ and a peak melting point of less than 126° C.; (ii) a second layer comprising from 60 to 100 percent by weight polyethylene having a density of 0.905 to 0.970 g/cm³ and a peak melting point in the range of 100° C. to 135° C.; and (iii) at least one inner layer between the first layer and the second layer comprising from 40 to 100 percent by weight of a high density polyethylene having a density from 0.930 to 0.970 g/cm³ and a peak melting point in the range of 120° C. to 135° C.; and (b) a coating on an outer surface of the second layer of the film comprising polyurethane.

In another aspect, the present invention provides a coated film that comprises (a) a film comprising (i) a first layer comprising from 70 to 100 percent by weight of a linear low density polyethylene having a density less than 0.930 g/cm³ and a peak melting point of less than 126° C.; (ii) a second layer comprising from 60 to 100 percent by weight polyethylene having a density of 0.905 to 0.970 g/cm³ and a peak melting point in the range of 100° C. to 135° C.; and (iii) at least one inner layer between the first layer and the second layer comprising from 40 to 100 percent by weight of a high density polyethylene having a density from 0.930 to 0.970 g/cm³ and a peak melting point in the range of 120° C. to 135° C.; and (b) a coating on an outer surface of the second layer of the film comprising polyurethane, wherein the coated film is thermally resistant under the sealing conditions of ASTM F1921-98 over a temperature range of 80° C. to 180° C., and/or has a gloss of at least 70 units at 60°.

In another aspect, the present invention provides a coated film that comprises (a) a monolayer film comprising from 70 to 100 percent by weight polyethylene having a density less than 0.930 g/cm³ and a melt index ($I_2$) of less than 2.0 g/10 minutes, and a peak melting point of less than 126° C.; and (b) a coating on an outer surface of the film comprising polyurethane. In another aspect, the present invention provides a coated film that comprises (a) a monolayer film comprising from 70 to 100 percent by weight polyethylene having a density less than 0.930 g/cm³ and a melt index ($I_2$) of less than 2.0 g/10 minutes, and a peak melting point of less than 126° C.; and (b) a coating on an outer surface of the film comprising polyurethane, wherein the coated film is thermally resistant under the sealing conditions of ASTM F1921-98 over a temperature range of 80° C. to 180° C., and/or has a gloss of at least 70 units at 60°.

In one aspect, the present invention provides a coated film that comprises (a) a film comprising (i) a first layer comprising from 70 to 100 percent by weight of a linear low density polyethylene having a density less than 0.930 g/cm³ and a peak melting point of less than 126° C.; (ii) a second layer comprising from 60 to 100 percent by weight polypropylene; and (iii) at least one inner layer between the first layer and the second layer comprising from 40 to 100 percent by weight of a high density polyethylene having a density from 0.930 to 0.970 g/cm³ and a peak melting point in the range of 120° C. to 135° C.; and (b) a coating on an outer surface of the second layer of the film comprising polyurethane.

In another aspect, the present invention provides a coated film that comprises (a) a film comprising (i) a first layer comprising from 70 to 100 percent by weight of a linear low density polyethylene having a density less than 0.930 g/cm³ and a peak melting point of less than 126° C.; (ii) a second layer comprising from 60 to 100 percent by weight polypropylene; and (iii) at least one inner layer between the first layer and the second layer comprising from 40 to 100 percent by weight of a high density polyethylene having a density from 0.930 to 0.970 g/cm³ and a peak melting point in the range of 120° C. to 135° C.; and (b) a coating on an outer surface of the second layer of the film comprising polyurethane, wherein the coated film is thermally resistant under the sealing conditions of ASTM F1921-98 over a temperature range of 80° C. to 180° C., and/or has a gloss of at least 70 units at 60°.

In another aspect, the present invention provides a coated film that comprises (a) a monolayer film comprising from 70 to 100 percent by weight polypropylene; and (b) a coating on an outer surface of the film comprising polyurethane. In another aspect, the present invention provides a coated film that comprises (a) a monolayer film comprising from 70 to 100 percent by weight polypropylene; and (b) a coating on an outer surface of the film comprising polyurethane, wherein the coated film is thermally resistant under the sealing conditions of ASTM F1921-98 over a temperature range of 80° C. to 180° C., and/or has a gloss of at least 70 units at 60°.

In some embodiments, the polyurethane is formed from: (a) a hydroxyl terminated urethane; and (b) an isocyanate-functional prepolymer. The isocyanate-functional prepolymer, in some embodiments, comprises an aromatic isocyanate. The hydroxyl terminated urethane comprises at least one of a hydroxyl terminated polyether-based urethane, a hydroxyl terminated polyester-based urethane, and a hydroxyl terminated polyester-polyether-based urethane, in some embodiments. Additional details regarding the polyurethane that can be used in the coating in various embodiments of the present invention are provided herein.

The film to be coated is a blown film in some embodiments. In embodiments where the coated film is a multilayer blown film, the linear low density polyethylene in the first layer, the polyethylene in the second layer, and the high density polyethylene in the at least one additional layer each have a melt index ($I_2$) of less than 2.0 g/10 minutes.

In some embodiments, the coated film is a cast film. In embodiments where the coated film is a multilayer cast film, the linear low density polyethylene in the first layer, the polyethylene in the second layer, and the high density polyethylene in the at least one additional layer each have a melt index ($I_2$) of 2.0 g/10 minutes or more. In some embodiments, one or more of the linear low density polyethylene in the first layer, the polyethylene in the second layer, and the high density polyethylene in the at least one additional layer can have a melt index ($I_2$) of less than 2.0 g/10 minutes. In some embodiments, one or more of the linear low density polyethylene in the first layer, the polyethylene in the second layer, and the high density polyethylene in the at least one additional layer can have a melt index ($I_2$) of 0.1-2.0 g/10 minutes, or 0.5-2.0 g/10 minutes.

The coated film, in some embodiments, has a gloss of at least 85 units at 60°.

The amount of coating on the outer surface of the film (or the outer surface of a layer of a multilayer film), in some embodiments, is 1 to 7 g/m².

In some embodiments, the coated film has a coefficient of friction of 0.15 to 1.0 on the coated surface.

In some embodiments where the film is a multilayer layer film comprising two or more layers, the film can comprise one or more lower density inner layers between the first layer and the second layer comprising from 50 to 100 percent by weight polyethylene having a density of 0.920 g/cm³ or less, and a peak melting point in the range of 90° C. to 120° C., preferably 100° C. to 115° C. In some embodiments where the film is a multilayer film comprising two or more layers, the film can comprise one or more layers comprising polypropylene, propylene-based copolymers, a cyclic olefin copolymer, or mixtures thereof. In some embodiments where the film is a multilayer layer film comprising two or more layers, the film can further comprise a barrier layer. A barrier layer, in such embodiments, can comprise, for example, polyamide or ethylene vinyl alcohol.

Embodiments of the present invention also provide articles formed from any of the coated films described herein. In some such embodiments, the coated film has a thickness of 20 to 250 microns. Examples of such articles can include flexible packages, pouches, stand-up pouches, bags, and pre-made packages or pouches. In some embodiments, coated films of the present invention can be used in form, fill and seal processes to make packages, pouches, or other articles.

As noted above, in some embodiments, the film is a multilayer film. In such embodiments, a first layer comprises from 70 to 100 percent by weight of a linear low density polyethylene. The first layer is a surface layer in some embodiments. All individual values and subranges from 70 to 100 percent by weight (wt %) are included herein and disclosed herein; for example the amount of the linear low density polyethylene can be from a lower limit of 70, 80, or 90 wt % to an upper limit of 80, 90, or 100 wt %. For example, the amount of the first linear low density polyethylene can be from 80 to 100 wt %, or in the alternative, from 70 to 90 wt %, or in the alternative, from 75 to 95 wt %, or in the alternative from 80 to 100 wt %.

The linear low density polyethylene has a density less than or equal to 0.930 g/cc (cm$^3$). All individual values and subranges less than or equal to 0.930 g/cc are included herein and disclosed herein; for example, the density of the linear low density polyethylene can be from an upper limit of 0.928, 0.925, 0.920 or 0.915 g/cc In some aspects of the invention, the first linear low density polyethylene has a density greater than or equal to 0.870 g/cc. All individual values and subranges between 0.870 and 0.930 are included herein and disclosed herein.

The linear low density polyethylene has a peak melting point of 126° C. or less in some embodiments, preferably between 70 and 121° C., more preferably between 80 and 121° C.

The melt index of the linear low density polyethylene in the first layer can depend on a number of factors including whether the film is a blown film or a cast film. In embodiments where the film is a blown film, the linear low density polyethylene has an $I_2$ less than or equal to 2.0 g/10 minutes. All individual values and subranges from 2.0 g/10 minutes are included herein and disclosed herein. For example, the first linear low density polyethylene can have a melt index from an upper limit of 2.0, 1.7, 1.4, 1.1, or 0.9 g/10 minutes. In a particular aspect of the invention, the linear low density polyethylene has an $I_2$ with a lower limit of 0.1 g/10 minutes. All individual values and subranges from 0.1 g/10 minutes are included herein and disclosed herein. For example, the first linear low density polyethylene can have an $I_2$ greater than or equal to 0.1, 0.2, 0.3, or 0.4 g/10 minutes.

In other embodiments, the film can be a cast film. In such embodiments, the linear low density polyethylene has an $I_2$ greater than or equal to 2.0 g/10 minutes. All individual values and subranges above 2.0 g/10 minutes are included herein and disclosed herein. For example, the first linear low density polyethylene can have a melt index from a lower limit of 2.0, 3.0, 4.0, 5.0, 6.0, or 10 g/10 minutes. In some embodiments, the first linear low density polyethylene for a cast film application can have an upper melt index limit of 15 g/10 minutes. In some embodiments, depending on the other components in the first layer or other layers, the first linear low density polyethylene in the first layer for a cast film application can have an upper limit of $I_2$ of less than 2.0 g/10 minutes. In some embodiments, the linear low density polyethylene in the first layer for a cast film application can have a melt index ($I_2$) of 0.1-2.0 g/10 minutes, or 0.5-2.0 g/10 minutes. All individual values and subranges from 0.1 to 2.0 g/10 minutes are included herein and disclosed herein.

Examples of linear low density polyethylenes that can be used in the first layer include those commercially available from The Dow Chemical Company under the names AFFINITY™, DOWLEX™, and ELITE™ AT including, for example, AFFINITY™ PL 1146G, AFFINITY™ 1881G, DOWLEX™ 2045G, DOWLEX™ 2645G, ELITE™ AT 6401, and ELITE™ 5401G. Examples of ultra low density polyethylenes that can be used in the first layer include those commercially available from The Dow Chemical Company under the name ATTANE™ including, for example, ATTANE™ 4203.

In embodiments where the first layer comprises <100% of the first linear low density polyethylene, the first layer further comprises one or more additional polyethylene resins such as, for example, one or more low density polyethylenes having a melt index from 0.1 to 5 g/10 minutes, one or more additional linear low density polyethylenes having a density of 0.930 g/cc or more and a melt index from 0.1 to 5 g/10 minutes.

In embodiments wherein the film comprises a multilayer film, a second layer comprises from 60 to 100 percent by weight of a polyethylene. The second layer is another surface layer in some embodiments. All individual values and subranges from 60 to 100 percent by weight (wt %) are included herein and disclosed herein; for example the amount of the polyethylene can be from a lower limit of 60, 70, 80, or 90 wt % to an upper limit of 70, 80, 90, or 100 wt %. For example, the amount of the polyethylene can be from 70 to 100 wt %, or in the alternative, from 60 to 90 wt %, or in the alternative, from 65 to 95 wt %, or in the alternative from 70 to 100 wt %.

The polyethylene in the second layer has a density of 0.905 to 0.970 g/cc (cm$^3$). All individual values and subranges from 0.910 to 0.970 g/cc are included herein and disclosed herein; for example, the density of the polyethylene can be from a lower limit of 0.905, 0.910, 0.920, 0.930, 0.940, or 0.950 g/cc to an upper limit of 0.930, 0.940, 0.950, 0.960, 0.970 g/cc. In some embodiments, the polyethylene has a density from 0.910 to 0.970 g/cc, preferably between 0.920 to 0.960 g/cc, more preferably between 0.940 to 0.960 g/cc.

The polyethylene in the second layer has a peak melting point of 100° C. to 135° C. in some embodiments, preferably between 121 and 132° C., more preferably between 126 and 132° C.

The melt index of the polyethylene in the second layer can depend on a number of factors including whether the film is a blown film or a cast film. In embodiments where the film is a blown film, the polyethylene has an $I_2$ less than or equal to 2.0 g/10 minutes. All individual values and subranges from 2.0 g/10 minutes are included herein and disclosed herein. For example, the polyethylene can have a density from an upper limit of 2.0, 1.7, 1.4, 1.1, or 0.9 g/10 minutes. In a particular aspect of the invention, the polyethylene has an $I_2$ with a lower limit of 0.1 g/10 minutes. All individual values and subranges from 0.1 g/10 minutes are included herein and disclosed herein. For example, the polyethylene can have an $I_2$ greater than or equal to 0.1, 0.2, 0.3, or 0.5 g/10 minutes.

In other embodiments, the film can be a cast film. In such embodiments, the polyethylene in the second layer has an $I_2$ greater than or equal to 2.0 g/10 minutes. All individual values and subranges above 2.0 g/10 minutes are included herein and disclosed herein. For example, the first linear low density polyethylene can have a melt index from a lower limit of 2.0, 3.0, 4.0, 5.0, 6.0, or 10 g/10 minutes. In some embodiments, the polyethylene in the second layer for a cast film application can have an $I_2$ of up to 15 g/10 minutes. In some embodiments, depending on the other components in the second layer or other layers, the polyethylene in the second layer for a cast film application can have an upper limit of $I_2$ of less than 2.0 g/10 minutes. In some embodiments, the polyethylene in the second layer for a cast film application can have a melt index ($I_2$) of 0.1-2.0 g/10 minutes, or 0.5-2.0 g/10 minutes. All individual values and subranges from 0.1 to 2.0 g/10 minutes are included herein and disclosed herein.

Examples of polyethylenes that can be used in the second layer include those commercially available from The Dow Chemical Company under the names DOWLEX™ and ELITE™, and ATTANE™, such as DOWLEX™ 2045G, DOWLEX™ NG2038B, ELITE™ 5111G, ELITE™ 5400G, ELITE™ 5960G, and ATTANE 4203.

In embodiments where the second layer comprises <100% of the polyethylene described above, the second layer further comprises one or more additional polyethylene resins such as, for example, one or more low density polyethylenes having a melt index from 0.1 to 5 g/10 minutes, one or more additional linear low density polyethylenes having a density of 0.930 g/cc or less and a melt index from 0.1 to 5 g/10 minutes.

In embodiments wherein the film comprises a multilayer film, a second layer comprises from 60 to 100 percent by weight of a polypropylene. The second layer is another surface layer in some embodiments. All individual values and subranges from 60 to 100 percent by weight (wt %) are included herein and disclosed herein; for example the amount of the polypropylene can be from a lower limit of 60, 70, 80, or 90 wt % to an upper limit of 70, 80, 90, or 100 wt %. For example, the amount of the polypropylene can be from 70 to 100 wt %, or in the alternative, from 60 to 90 wt %, or in the alternative, from 65 to 95 wt %, or in the alternative from 70 to 100 wt %.

The polypropylene that can be used in the second layer can be homopolymer polypropylene (hPP), random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof. Examples of homopolymer propylenes that can be used in some embodiments of the present invention include homopolymer propylenes commercially available from LyondellBasell Industries (e.g., Pro-fax PD702), from Braskem (e.g., D115A), and from Borealis (e.g., WF 420HMS). The polypropylene that can be used in the second layer can also be a propylene-alpha-olefin interpolymer. Such propylene/alpha-olefin interpolymers are commercially available from The Dow Chemical Company, under the trade name VERSIFY™, or from ExxonMobil Chemical Company, under the trade name VISTAMAXX.

In embodiments where the second layer comprises <100% of the polypropylene described above, the second layer further comprises one or more polyethylene resins such as, for example, one or more low density polyethylenes having a melt index from 0.1 to 5 g/10 minutes, one or more additional linear low density polyethylenes having a density of 0.930 g/cc or less and a melt index from 0.1 to 5 g/10 minutes.

In embodiments wherein the film is a multilayer film having first and second layers as described above, the film can further comprise one or more inner layers between the first layer and the second layer. In such embodiments, at least one of the inner layers can comprise from 40 to 100 percent by weight of a high density polyethylene. All individual values and subranges from 40 to 100 percent by weight (wt %) are included herein and disclosed herein; for example the amount of the high density polyethylene can be from a lower limit of 40, 50, 60, 70, 80, or 90 wt % to an upper limit of 50, 60, 70, 80, 90, or 100 wt %. For example, the amount of the high density polyethylene can be from 50 to 100 wt %, or in the alternative, from 60 to 90 wt %, or in the alternative, from 65 to 95 wt %, or in the alternative from 70 to 100 wt %.

The high density polyethylene has a density of 0.930 g/cc (cm$^3$) to 0.970 g/cc. All individual values and subranges from 0.930 to 0.970 g/cc are included herein and disclosed herein; for example, the density of the polyethylene can be from a lower limit of 0.930, 0.940, 0.950, or 0.960 g/cc to an upper limit of 0.950, 0.960, or 0.970 g/cc. In some embodiments, the high density polyethylene has a density of 0.940 g/cc or more.

The high density polyethylene has a peak melting point of 126° C. to 135° C. in some embodiments, preferably between 126 and 132° C., more preferably between 127 and 132° C.

The melt index of the high density polyethylene in the at least one inner layer can depend on a number of factors including whether the film is a blown film or a cast film. In embodiments where the film is a blown film, the high density polyethylene has an $I_2$ less than or equal to 2.0 g/10 minutes. All individual values and subranges from 2.0 g/10 minutes are included herein and disclosed herein. For example, the high density polyethylene can have a density from an upper limit of 2.0, 1.7, 1.4, 1.1, or 0.9 g/10 minutes. In a particular aspect of the invention, the high density polyethylene has an $I_2$ with a lower limit of 0.1 g/10 minutes. All individual values and subranges from 0.1 g/10 minutes are included herein and disclosed herein. For example, the high density polyethylene can have an $I_2$ greater than or equal to 0.1, 0.2, 0.3, or 0.4 g/10 minutes.

In other embodiments, the film can be a cast film. In such embodiments, the high density polyethylene has an $I_2$ greater than or equal to 2.0 g/10 minutes. All individual values and subranges above 2.0 g/10 minutes are included herein and disclosed herein. For example, the high density polyethylene in the at least one inner layer can have a melt index from a lower limit of 2.0, 3.0, 4.0, 5.0, 6.0, or 10 g/10 minutes. In some embodiments, the high density polyethylene in the at least one inner layer for a cast film application can have an $I_2$ of up to 15 g/10 minutes. In some embodiments, depending on the other components in the inner layer(s) or other layers, the high density polyethylene in the at least one inner layer for a cast film application can have an upper limit of $I_2$ of less than 2.0 g/10 minutes. In some embodiments, the high density polyethylene in the at least one inner layer for a cast film application can have a melt index ($I_2$) of 0.1-2.0 g/10 minutes, or 0.5-2.0 g/10 minutes. All individual values and subranges from 0.1 to 2.0 g/10 minutes are included herein and disclosed herein.

Examples of high density polyethylenes that can be used in the at least one inner layer include those commercially available from The Dow Chemical Company under the names DOWLEX™ and ELITE™, such as ELITE™ 5940G, and ELITE™ 5960G. In some embodiments, a medium density polyethylene can be used in the inner layer instead of, or in addition to a high density polyethylene. An example of such a medium density polyethylene is DOWLEX™ 2038.68G from The Dow Chemical Company.

In embodiments where an inner layer comprises <100% of the polyethylene described above, the inner layer further comprises one or more additional polyethylene resins such as, for example, one or more low density polyethylenes having a melt index from 0.1 to 5 g/10 minutes, one or more additional linear low density polyethylenes having a density of 0.930 g/cc or less and a melt index from 0.1 to 5 g/10 minutes.

In addition to an inner layer comprising 40 to 100 percent by weight of a high density polyethylene, in some embodiments, the film can comprise one or more additional inner layers comprising other polyethylenes or combinations of polyethylenes, such as one or more low density polyethylenes, one or more linear low density polyethylenes, or combinations thereof. For example, in one embodiment, the film comprises at least one additional inner layer wherein the additional inner layer comprises 50 to 100 weight percent of a polyethylene having a density of 0.920 g/cc (cm$^3$) or less. All individual values and subranges for a density of polyethylene from 0.920 g/cc are included herein and disclosed herein; for example, the density of the polyethylene can be to an upper limit of 0.900, 0.905, 0.910, 0915, or 0.920 g/cc. Such inner layers can be provided, for example, to enhance the strength of the film.

The melt index of the polyethylene in the at least one additional inner layer can depend on a number of factors including whether the film is a blown film or a cast film. In embodiments where the film is a blown film, the polyethylene in the at least one additional layer has an $I_2$ less than or equal to 2.0 g/10 minutes. All individual values and subranges from 2.0 g/10 minutes are included herein and disclosed herein. For example, the polyethylene can have a density from an upper limit of 2.0, 1.7, 1.4, 1.1, or 0.9 g/10 minutes. In a particular aspect of the invention, the polyethylene has an $I_2$ with a lower limit of 0.01 g/10 minutes. All individual values and subranges from 0.1 g/10 minutes are included herein and disclosed herein. For example, the polyethylene can have an $I_2$ greater than or equal to 0.1, 0.2, 0.3, or 0.4 g/10 minutes.

In other embodiments, the film can be a cast film. In such embodiments, the polyethylene in the at least one additional inner layer has an $I_2$ greater than or equal to 2.0 g/10 minutes. All individual values and subranges above 2.0 g/10 minutes are included herein and disclosed herein. For example, the polyethylene can have a melt index from a lower limit of 2.0, 3.0, 4.0, 5.0, 6.0, or 10 g/10 minutes. In some embodiments, the polyethylene in the at least one additional inner layer for a cast film application can have an $I_2$ of up to 15 g/10 minutes. In some embodiments, depending on the other components in the inner layer(s) or other layers, the polyethylene in the at least one additional inner layer for a cast film application can have an upper limit of $I_2$ of less than 2.0 g/10 minutes. In some embodiments, the polyethylene in the at least one additional inner layer for a cast film application can have a melt index ($I_2$) of 0.1-2.0 g/10 minutes, or 0.5-2.0 g/10 minutes. All individual values and subranges from 0.1 to 2.0 g/10 minutes are included herein and disclosed herein.

Examples of polyethylenes having a density of 0.920 g/cc or less that can be used in the at least one additional inner layer include those commercially available from The Dow Chemical Company under the names DOWLEX™, ELITE™, and ATTANE™, such as DOWLEX™ 2045G, ELITE™ 5401G, and ATTANE™ 4203G.

In any of the above layers (but preferably in the inner layers) of a multilayer film, other polyolefin resins can be included in addition to the polyethylene for a variety of reasons. For example, a layer in a multilayer film can comprise other polyolefin resins, such as polypropylene and/or cyclic olefin copolymers (e.g., cyclic olefin copolymers commercially available from TOPAS Advance polymers such as TOPAS 6013), to provide increased stiffness without significant harm to the compatibility among materials and potential recyclability. In such embodiments, the additional polyolefin resins can be provided in amounts less than 50 weight percent.

In some embodiments, a multilayer film that can be used in coated films of the present invention can comprise 3 or more layers. A multilayer film that can be used in coated films of the present invention can comprise up to 7 layers in some embodiments. The number of layers in the film can depend on a number of factors including, for example, the desired thickness of the multilayer film, the desired properties of the multilayer film, the intended use of the multilayer film, and other factors.

In some embodiments, one or more layers in multilayer film can comprise one or more additives. Additives can include, but are not limited to, antistatic agents, color enhancers, dyes, lubricants, fillers (for example, TiO2 or CaCO3), opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, oxygen scavengers, moisture scavengers, and combinations thereof, depending on the requirements of a particular application.

In some embodiments, depending on the desired use or requirements of the film, the film can comprise other layers such as barrier layers. For example, for some uses, it may be desirable for the film to provide a barrier to moisture, light, aroma/odor, and/or oxygen transmission. Such barrier layers can include, for example, polyamide films, ethylene vinyl alcohol films, and other layers as known to those of skill in the art. In such embodiments, one or more tie layers may be included in the film to adhere the barrier layer(s) to the polyethylene-based layer(s).

In some embodiments, a film to be coated with the polyurethane coating comprises a monolayer film. In such embodiments, the monolayer film can comprise from 70 to 100 percent by weight polyethylene having a density less than 0.930 g/cm$^3$ and a melt index ($I_2$) of less than 2.0 g/10 minutes, and a peak melting point of less than 126° C. All individual values and subranges from 70 to 100 percent by weight (wt %) are included herein and disclosed herein; for example the amount of the polyethylene can be from a lower limit of 70, 80, or 90 wt % to an upper limit of 80, 90, or 100 wt %. For example, the amount of the polyethylene can be from 80 to 100 wt %, or in the alternative, from 70 to 90 wt %, or in the alternative, from 75 to 95 wt %, or in the alternative from 80 to 100 wt %.

The polyethylene used in the monolayer has a density less than or equal to 0.930 g/cc (cm$^3$). All individual values and subranges less than or equal to 0.930 g/cc are included herein and disclosed herein; for example, the density of the polyethylene can be from an upper limit of 0.928, 0.925, 0.920 or 0.915 g/cc. In some aspects of the invention, the polyethylene has a density greater than or equal to 0.870 g/cc. All individual values and subranges between 0.870 and 0.930 g/cc are included herein and disclosed herein.

The polyethylene used in the monolayer has a peak melting point of 126° C. or less in some embodiments, preferably between 70 and 121° C., more preferably between 80 and 121° C.

The melt index of the polyethylene used in the monolayer ($I_2$) is less than or equal to 2.0 g/10 minutes in some embodiments. All individual values and subranges from 2.0 g/10 minutes are included herein and disclosed herein. For example, the polyethylene can have a density from an upper limit of 2.0, 1.7, 1.4, 1.1, or 0.9 g/10 minutes. In a particular aspect of the invention, the polyethylene has an $I_2$ with a lower limit of 0.1 g/10 minutes. All individual values and subranges from 0.1 g/10 minutes are included herein and disclosed herein. For example, the polyethylene can have an $I_2$ greater than or equal to 0.1, 0.2, 0.3, or 0.4 g/10 minutes.

Examples of polyethylenes having a density of 0.930 g/cc or less, a melt index ($I_2$) of 2.0 g/10 minutes or less, and a peak melting point of 126° C. or less that can be used in a monolayer film according to some embodiments include those commercially available from The Dow Chemical Company under the names AFFINITY™, ELITE™ AT, and ATTANE™, such as AFFINITY™ PL 1146G, AFFINITY™ 1888, ELITE™ AT 6401, ELITE™ 5401G, and ATTANE™ 4203.

In the case of a monolayer film, other polyolefin resins can be included in the monolayer in addition to the polyethylene for a variety of reasons. For example, the monolayer can comprise polyolefin resins, such as polypropylene and/or cyclic olefin copolymers (e.g., cyclic olefin copolymers commercially available from TOPAS Advance polymers such as TOPAS 6013), to provide increased stiffness. In such embodiments, the additional polyolefin resins can be provided in amounts less than 50 weight percent.

In embodiments where the monolayer comprises <100% of the polyethylene described above, the monolayer further comprises one or more additional polyethylene resins such as, for example, one or more low density polyethylenes having a melt index from 0.1 to 5 g/10 minutes, one or more additional linear low density polyethylenes having a density of 0.930 g/cc or less and a melt index from 0.1 to 5 g/10 minutes.

It is preferred that the films used in embodiments of the present invention be formed in a blown film or cast film process as is generally known in the art, although other methods such as lamination can be used.

The present invention provides a polyurethane-based coating on an outer surface of the film. In the case of a multilayer film, the outer surface is the outer surface of the second layer comprising from 60 to 100 percent by weight polyethylene having a density of 0.905 to 0.970 g/cm³ and a peak melting point in the range of 100° C. to 135° C. In the case of a monolayer film, the polyurethane-based coating is on one of the outer surfaces of the film.

The term "polyurethane-based coating" is used to indicate that upon curing, the coating comprises primarily polyurethane but that the coating may also include, in some embodiments, unreacted reactants (e.g., polyols, isocyanates, etc.) as well as other additives.

In some embodiments, the polyurethane is formed from: (a) a hydroxyl terminated polyol or urethane; and (b) an isocyanate-functional prepolymer. The isocyanate-functional prepolymer, in some embodiments, comprises an aromatic isocyanate. Examples of aromatic isocyanates that can be used in some embodiments of the present invention include any or all isomers of toluene diisocyanate (TDI) and/or any or all isomers of methylene diphenyl diisocyanate (MDI). In some embodiments, the isocyanate-functional prepolymer comprises an aliphatic isocyanate. Examples of aliphatic isocyanates that can be used in some embodiments of the present invention include any and all isomers of isophorone diisocyanate (IPDI), any and all isomers of hexamethylene diisocyanate (HDI), any and all isomers of xylylene diisocyanate (XDI), any and all isomers of hydrogenated xylylene diisocynate (H6XDI), and any and all isomers of meta-tetramethylxylylene diisocyanate (TMXDI). The hydroxyl terminated urethane comprises at least one of a hydroxyl terminated polyether-based urethane, a hydroxyl terminated polyester-based urethane, and a hydroxyl terminated polyester-polyether-based urethane, in some embodiments.

The polyurethane may be formed by mixing together two separate components at a prescribed mixing ratio and then curing upon reaction between the two components. In some embodiments, the two reactant components can be prepared so as to provide a mixing ratio of 1:1 (ratio of hydroxyl terminated polyol or urethane to isocyanate-functional prepolymer) to facilitate measuring and mixing. In some embodiments, such mixing ratio can be in the range from 1:0.2 to 1:2. At such mixing ratios, in some embodiments, the isocyanate index is in the range from ~1:1 to ~3:3. In some embodiments, the polyurethane may be a one-component isocyanate terminated prepolymer that reacts with ambient moisture or humidity to complete its cure.

The polyurethane components may be comprised of polyether polyols, polyester polyols, or a combination of both. Such polyols can be linear or branched in some embodiments. Polyesters with aromatic components can be used to impart alternative performance properties such as chemical or heat resistance for a targeted application in some embodiments. In some embodiments, the coating is formed from polyols having molecular weights between 100 and 4700 Daltons and using multifunctional reagents that impart branching such as triisopropanolamine and trimethylolpropane. Such selected materials, when reacted together and combined with certain non-reactive additives, can advantageously provide desirable heat resistance, anti-blocking character, targeted coefficient of friction, and targeted gloss levels to coated films in accordance with some embodiments of the present invention.

The coating can be applied to the outer surface of the film using a variety of techniques by which coatings are typically applied to films including, but not limited to, for example, gravure coating and flexographic coating. Other thin coating techniques may also be used. Persons of skill in the art with equipment to apply solvent-based and/or water-based coatings and adhesives can readily adapt their process to apply a polyurethane coating to a film to obtain the coated films of the present invention. To achieve adequate dynamic viscosity, the target solids at application will depend on the particular coating, but in some embodiments, can be in range of 15% to 80%.

The amount of coating applied to the film, in some embodiments, can be at least 1 gram per square meter. As used herein, the amount of coating is determined by measuring the difference of the weight of the film before coating and after the coating is applied and dried. In some embodiments, the amount of coating applied to the film is up to 7 grams per square meter. The amount of coating applied to the film, in some embodiments, is 1 to 7 grams per square meter. All individual values and subranges from 1 to 7 grams per square meter are included herein and disclosed herein; for example, the amount of coating may be from a lower limit of 1, 2, 3, 4, 5, or 6 grams per square meter to an upper limit of 2, 3, 4, 5, 6, or 7 grams per square meter. For example, the amount of coating can be from 3 to 5 grams per square meter in some embodiments.

Various embodiments of coated films of the present invention can have one or more desirable properties including, for example, a broad thermal resistance range, high gloss, stable coefficient of friction on the coated surface, and/or other properties. In some embodiments, coated films of the present invention have a broad thermal resistance range. Coated films, according to some embodiments of the present invention, are thermally resistant over a range of temperatures from 80° C. to 200° C. As used herein, the lower temperature of the range of thermal resistance is the temperature at which the coated film exhibits a heat seal strength of at least 1 lb/in when measured according to ASTM 1921-98. As used herein, the upper temperature of the range of thermal resistance is the temperature at which the coated film exhibits burn through such that the heat seal strength cannot be measured according to ASTM 1921-98 due to deformation in the coated film.

In some embodiments, coated films of the present invention exhibit high gloss, particularly as compared to uncoated polyethylene films. In some embodiments, coated films exhibit a gloss of at least 70 units at 60° when measured according to ASTM D2457. Coated films, in some embodiments, exhibit a gloss of up to 100 units at 60° when measured according to ASTM D2457. In some embodiments, coated films exhibit a gloss of 70 to 100 units at 60° when measured according to ASTM D2457. All individual values and subranges from 70 to 100 units at 60° are included herein and disclosed herein; for example, the gloss can be from a lower limit of 70, 75, 80, 85, or units to an upper limit of 90, 95, or 100 units. For example, in some embodiments, the coated films can exhibit a gloss of at least 85 units at 60° when measured according to ASTM D2457. In some embodiments, coated films exhibit a gloss of 85 to 100 units at 60° when measured according to ASTM D2457.

In some embodiments, coated films of the present invention can exhibit a stable coefficient of friction on the coated surface. For example, in some embodiments, the coated surface exhibits a kinetic coefficient of friction of 0.15 to 1.0 when measured film-to-metal according to ASTM 1894. The coated surface exhibits a kinetic coefficient of friction of 0.1 to 0.4 when measured film-to-metal according to ASTM 1894 in some embodiments.

Embodiments of the present invention also relate to articles formed from any of the coated films disclosed herein. In some embodiments, the article is a flexible package. In some embodiments, the flexible package comprises a first coated film according to the present invention and a second coated film according to the present invention. In some embodiments, the flexible package comprises a first coated film according to the present invention, a second coated film according to the present invention, and a third or more coated films according to the present invention. In some embodiments, the first coated film according to the present invention is heat sealed using the sealable side to another heat sealable surface, whether a film or a sheet or a formed container of any suitable construction that may or may not have a coating of the present invention on the non-heat sealable side of the film or sheet or formed container. Alternatively, the flexible package can be formed from a single coated film of the present invention that is folded.

In some embodiments, the flexible package is in the form of one or more of the following: a pouch, a sachet, and a stand up pouch that is formed using techniques known to those of skill in the art based on the disclosure herein.

The thickness of the coated film used to form the flexible package can be selected depending on a number of factors including, for example, the size of the flexible package, the volume of the flexible package, the contents of the flexible package, the desired properties of the flexible package, and other factors. In some such embodiments, the coated film has a thickness used in a flexible package of the present invention has a thickness of 20 to 400 microns. All individual values and subranges from 20 to 200 microns are included herein and disclosed herein; for example, the thickness of the coated film may be from a lower limit of 20, 30, 40, 50, 60, 70, 80, 90, 100, 110, 120, 130, 140, 150, 160, 170, 180, or 190 microns to an upper limit of 30, 40, 50, 60, 70, 80, 90, 100, 110, 120, 130, 140, 150, 160, 170, 180, 190, 200, 220, 250, 280, 300, 330, 350, 370, or 400 microns.

Non-limiting examples of contents suitable for containment by flexible packages of the present invention include comestibles (beverages, soups, cheeses, cereals), liquids, shampoos, oils, waxes, emollients, lotions, moisturizers, medicaments, pastes, surfactants, gels, adhesives, suspensions, solutions, enzymes, soaps, cosmetics, liniments, flowable particulates, and combinations thereof.

Some embodiments of the invention will now be described in detail in the following Examples.

EXAMPLES

Example 1

Preparation of Reactant Compositions for Polyurethane Coating

The following Examples include a multilayer film coated with a polyurethane coating according to an embodiment of the present invention. The polyurethane coating used in these Examples is prepared from two reactant compositions as follows.

Reactant Composition A comprises a hydroxyl terminated urethane and is prepared from the following ingredients:

| Ingredient | Description | Amount (wt. %) |
|---|---|---|
| ethyl acetate | Solvent from UNIVAR, Inc. | 26.5861 |
| Triisopropylanolamine (TIPA) | TIPA (99%) from The Dow Chemical Company | 20.2901 |
| monomeric toluene diisocyanate (TDI) | Mondur TD-80 Grade B from Bayer Material Science | 17.8299 |
| polyether diol | polyether diol (nominal molecular weight of 425) from The Dow Chemical Company | 13.8618 |
| polyether polyol | VORANOL 220-110N from The Dow Chemical Company | 21.4276 |
| antifoam | SAG-47 from Momentive Performance Materials | 0.0046 |

To prepare Reactant Composition A, the TIPA is melted. The polyether diol (nominal molecular weight of 425) is vacuum loaded into a reactor. The melted TIPA is vacuum loaded into the reactor, followed by the polyether polyol (VORANOL 220-110N). The vacuum lines are rinsed with ethyl acetate and the contents of the reactor are stirred at 75 RPM. Ethyl acetate is vacuum loaded into the reactor. The contents of the reactor are cooled via a cooling jacket. After cooling, the TDI is loaded to the reactor, and the vacuum lines are rinsed with ethyl acetate. Because of the exothermic nature of the reaction, the contents of the reactor are cooled to a temperature of 75° C. The temperature in the reactor is held at 75° C. under agitation for 4 hours. The contents of the reactor are then cooled to 60° C., and the viscosity is measured. If the viscosity is <2500 cP, the contents of the reactor are cooled to 40° C., and 0.393 weight percent TDI (based on the original TDI charge) is added, and the mix tank contents are heated and held at 75° C. for one hour. If the viscosity is >2500 cP, a mixture of the antifoam and the remaining ethyl acetate are vacuum loaded to the reactor. The contents are then stirred for 30 minutes. The reactor is then cooled to 50° C., and the Reactant Composition A is packaged for use.

Reactant Composition B comprises an isocyanate-functional prepolymer and is prepared from the following ingredients:

| Ingredient | Description | Amount (wt. %) |
|---|---|---|
| ethyl acetate | Solvent from UNIVAR, Inc. | 24.049 |
| Trimethylolpropane | Trimethylolpropane from Lanxess Corp. | 11.480 |
| monomeric toluene diisocyanate (TDI) | Mondur TD-80 Grade B from Bayer Material Science | 43.612 |
| Additive | Synaceti 125 from Werner G. Smith, Inc. | 1.191 |
| Lubricant | Refined corn oil from Cargill Inc. | 1.191 |
| cyclohexane | Cyclohexane from UNIVAR, Inc. | 18.423 |
| benzoyl chloride | benzoyl chloride from Aldrich Chemical Co. | 0.055 |

To prepare Reactant Composition B, the Additive and the Lubricant are premixed and held at 50° C. The trimethylolpropane is loaded to the reactor followed by ethyl acetate. The TDI is vacuum loaded to the reactor followed by the remainder of the ethyl acetate as a rinse. The batch is held at 70° C. for 3 hours. The batch is then cooled to 55° C. The viscosity of the batch is measured. If the viscosity is <380 cP, the viscosity of the batch is adjusted to >380 cP by adding trimethylolpropane. If the viscosity is >380 cP, or after the additional trimethylolpropane is added, the reactor is then cooled to 55° C. The premixed Additive/Lubricant are vacuum loaded to the reactor. The cyclohexane is then added to the reactor, and the contents are held at 45° C. and stirred 45 minutes until the contents are clear (e.g., Additive must be dissolved). The benzoyl chloride is then vacuum loaded to the reactor, and the contents are stirred for 15 minutes. Reactant Composition B is then packaged for use.

The foregoing discussion describes the synthesis of two components (Reactant Composition A and Reactant Composition B) that might be provided by a coating supplier and that can be used to form a polyurethane coating for some embodiments of the present invention. As discussed below, Reactant Composition A and Reactant Composition B can be applied to a film and reacted (e.g., by a film converter) to form the polyurethane coating on the film. In general, one part Reactant Composition A is mixed with one part Reactant Composition B. The Compositions are mixed together to ensure homogeneity, and are applied onto a target film at a target coating weight. To achieve adequate dynamic viscosity in these Samples, the target solids at application should be around 30%. The preferred coating technique is roll applied, either direct or reverse gravure, with or without a smoothing bar. Solvents are then removed by force dry, or air dry heated oven. The urethane reaction of Reactant Composition A and Reactant Composition B commences upon solvent removal. At a mix ratio of 1:1, the theoretical isocyanate index is ~1.4:1. For purposes of these examples, a polyurethane coating formed from Reactant Composition A and Reactant Composition B shall be referred to as PU Coating 1.

For the Examples discussed below, 100 grams of the coating mixture is prepared as follows. 27 grams of Reactant Composition A is mixed with 27 grams of Reactant Composition B and 44 grams of ethyl acetate as a diluent solvent. The mixture is stirred for two minutes to homogenize the mixture. The coating mixture is applied to the polyethylene film from top-to-bottom using a Mayer bar 5 as shown in FIG. 1. The coating is then air heated to remove the solvents.

Three samples are prepared for evaluation with each sample representing one embodiment of the present invention. The film in each sample is a five layer coextruded polyethylene film with the following composition:

| Layer | Component(s) (Nominal Thickness) | Density (g/cm$^3$) | $I_2$ (g/10 mins) | Peak Melting Temp. (° C.) |
|---|---|---|---|---|
| Top (G) | HDPE (15 microns) | 0.958-0.965 | 0.7-1.0 | 134 |
| Intermediate (F) | HDPE (15 microns) | 0.958-0.965 | 0.7-1.0 | 134 |
| Intermediate (D/E) | LDPE (25 microns) | 0.914-0.918 | 0.8-1.2 | 123 |
| Intermediate (B/C) | HDPE (25 microns) | 0.958-0.965 | 0.7-1.0 | 134 |
| Bottom (sealing) (A) | Sealant LLDPE (15 microns) | 0.897-0.902 | 0.75-1.25 | 95 |

Each of the resins is commercially available from The Dow Chemical Company.

A coextruded 5-layer film sample was produced on an Alpine 7-Layer blown film run by using the same polymer feed in two of the 7 layers represented as layers A/B/C/D/E/F/G (as designated in the above table) with the "A" layer (bottom) being in the inside of the bubble. The 5 layer structure is achieved by combining the "B" and "C" layers and the "D" and "e" layers. The individual feed lines are all 50 mm 30:1 L/D grooved feed extruders where each extruder was fed from a 4 component blender. The 7 extruders combined produce a feed to the 75 mm 7-layer flat die (16/16/26/26/16) of 23 kg/hr. The blow up ratio is 2.5:1. The standard frost line height is 30 cm. The film thickness is maintained using an auto profile air ring system and an IBC.

The polyurethane coating as described above is applied to the top layer of each of the film samples. For Sample A, the amount of polyurethane coating applied is 1.5 grams per square meter. For Sample B, the amount of polyurethane coating applied is 3 grams per square meter. For Sample C, the amount of polyurethane coating applied is 7 grams per square meter.

Gloss Test

Figure 2:
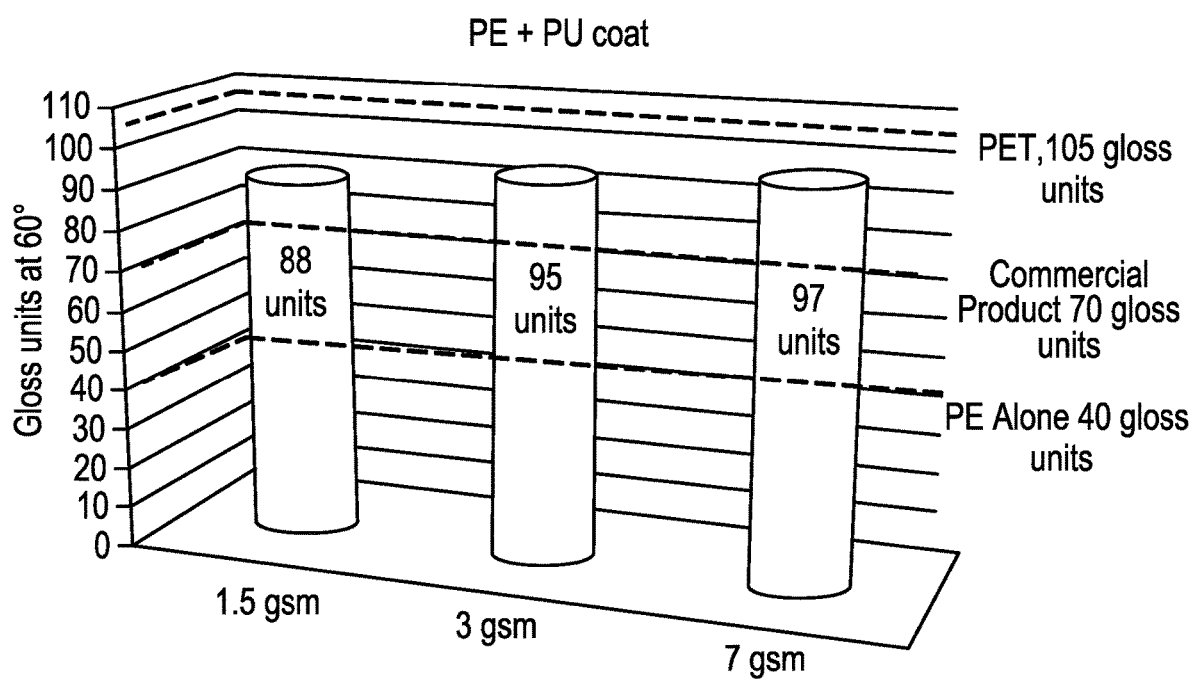
FIG. 2 is a graph illustrating the results of gloss tests in the Examples.

The gloss of Samples A-C are compared to the gloss of uncoated polyethylene film (having the same film structure as Samples A-C), to the gloss of a film (having the same film structure as Samples A-C) coated with a commercial, two-component overprinting varnish, and to the gloss of a PET film (which is understood to typically be 105 units at 60°). The gloss test performed is ASTM D2457 using a BYK Gardner Micro-Tri-Gloss Gloss Meter at 60°. The results are shown in FIG. 2. As shown in FIG. 2, Samples A-C have higher gloss than uncoated polyethylene film and the competitive product, with values approaching that of PET film.

Thermal Resistance Test

The thermal resistances of Samples A-C are also compared to the thermal resistance of uncoated polyethylene in a test based on ASTM F1921-98. In this test, the test specimen is sealed face-to-face using a Sencor sealing machine set up at 40 psi and 0.5 sec. The temperature is increased from 120° C. to 190° C. Two variances of sealing evaluation are performed. The film that was coated with the commercial, two-component overprinting varnish is not reported in FIGS. 3 and 4 (discussed below) because the specimen melted at temperatures above 130° C.

In the first sealing evaluation (with traction), the film is pulled back immediately after the heated jaws open in order to evaluate the tendency of elongation or breaking of the film. The evaluation is conducted with and without the use of a TEFLON liner between the heated jaw and the film. FIG. 3 illustrates the results of the first evaluation. If the film melts and is cut or elongates at the particular temperature, the temperature is not considered part of the sealing temperature operating window of the film. As shown in FIG. 3, the operating windows of Samples A-C, representing embodiments of the present invention, are generally much wider than those of uncoated polyethylene film. Sample C (with a polyurethane coating of 7 grams per square meter), for example, shows a thermal resistance range of 120° C. to over 180° C.

In the second sealing evaluation (without traction), the film is removed from the heated jaws after it cools down to again evaluate the tendency of elongation or breaking of the film. The second evaluation is conducted with and without the use of a TEFLON liner between the heated jaw and the film. FIG. 4 illustrates the results of the second evaluation. If the film melts and is cut or elongates at the particular temperature, the temperature is not considered part of the sealing temperature operating window of the film. As shown in FIG. 4, the operating windows of Samples A-C, representing embodiments of the present invention, are generally much wider than those of uncoated polyethylene film. Sample C (with a polyurethane coating of 7 grams per square meter), for example, shows a thermal resistance range of 120° C. to over 180° C.

Coefficient of Friction

Figure 5:
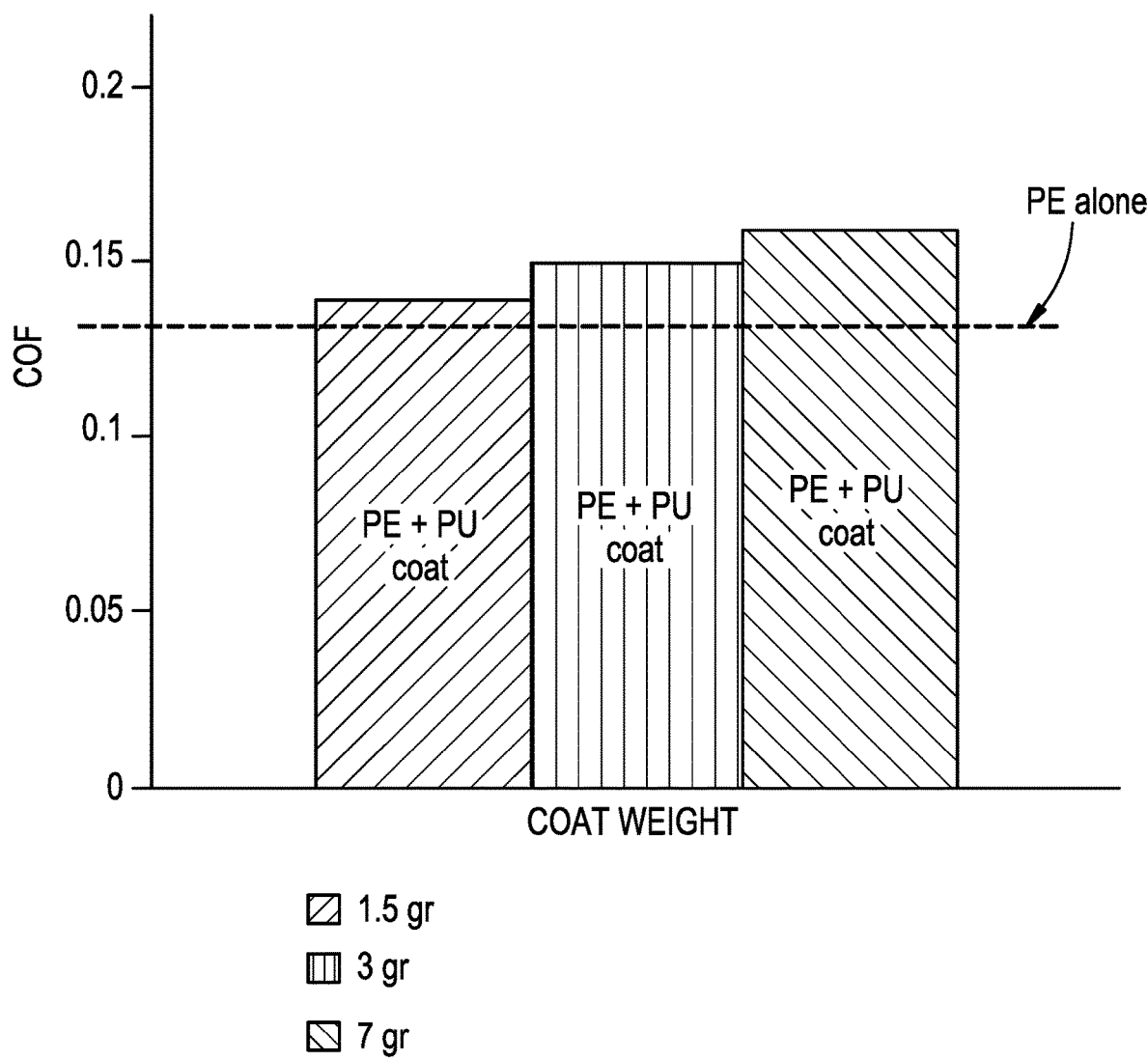
FIG. 5 is a chart showing the results of coefficient of friction testing in the Examples.

The coefficients of friction of Samples A-C are measured in accordance with ASTM 1894 to evaluate the variation as compared to uncoated polyethylene film. The results are shown in FIG. 5, and illustrate that the coefficients of friction of Samples A-C compare very favorably to the coefficient of friction of uncoated polyethylene film.

Example 2

Preparation of Additional Reactant Compositions for Polyurethane Coatings

Reactant Composition C comprises a methylene diphenyl diisocyanate (MDI) prepolymer and is prepared from the following ingredients:

| Ingredient | Description | Amount (wt. %) |
|---|---|---|
| ethyl acetate | Solvent from Nexeo, Inc. | 24.049 |
| Trimethylolpropane | Trimethylolpropane from ACROS Organics, Inc. | 6.471 |
| Isonate 125M (MDI) | Methylene diphenyl diisocyanate (MDI) from The Dow Chemical Company | 48.62 |
| Additive | Synaceti 125 from Werner G. Smith, Inc. | 1.191 |
| Lubricant | Refined corn oil from ACH Food Companies, Inc. | 1.191 |
| cyclohexane | Cyclohexane from Fisher Scientific, Inc. | 18.423 |
| benzoyl chloride | Benzoyl chloride from Aldrich Chemical Co. | 0.055 |

To prepare Reactant Composition C, the Additive and the Lubricant are premixed and held at 50° C. The trimethylolpropane is loaded to the reactor followed by ethyl acetate. The MDI is vacuum loaded to the reactor followed by the remainder of the ethyl acetate as a rinse. The batch is held at 70° C. for 3 hours. The batch is then cooled to 55° C. The viscosity of the batch is measured. If the viscosity is <380 cP, the viscosity of the batch is adjusted to >380 cP by adding trimethylolpropane. If the viscosity is >380 cP, or after the additional trimethylolpropane is added, the reactor is then cooled to 55° C. The premixed Additive/Lubricant is vacuum loaded to the reactor. The cyclohexane is then added to the reactor, and the contents are held at 45° C. and stirred 45 minutes until the contents are clear (e.g., Additive must be dissolved). The benzoyl chloride is then vacuum loaded to the reactor, and the contents are stirred for 15 minutes. Reactant Composition B is then packaged for use.

Reactant Composition A (from Example 1) and Reactant Composition C can be applied to a film and reacted (e.g., by a film converter) to form a polyurethane coating on the film. In general, one part Reactant Composition A is mixed with one part Reactant Composition C. The Compositions are mixed together to ensure homogeneity, and are applied onto a target film at a target coating weight. To achieve adequate dynamic viscosity, the target solids at application should be around 30%. The preferred coating technique is roll applied, either direct or reverse gravure, with or without a smoothing bar. Solvents are then removed by force dry, or air dry heated oven. The urethane reaction of Reactant Composition A and Reactant Composition C commences upon solvent removal. At a mix ratio of 1:1, the theoretical isocyanate index is ~1.4:1. For purposes of these examples, a polyurethane coating formed from Reactant Composition A and Reactant Composition C shall be referred to as PU Coating 2.

Reactant Composition D comprises an isophorone diisocyanate (IPDI) prepolymer and is prepared from the following ingredients:

| Ingredient | Description | Amount (wt. %) |
|---|---|---|
| ethyl acetate | Solvent from Nexeo, Inc. | 24.049 |
| Trimethylolpropane | Trimethylolpropane from ACROS Organics, Inc. | 8.031 |
| monomeric isophorone diisocyanate (IPDI) | Evonik Industries, Inc. | 47.06 |
| Additive | Synaceti 125 from Werner G. Smith, Inc. | 1.191 |
| Lubricant | Refined corn oil from ACH Food Companies, Inc.. | 1.191 |
| cyclohexane | Cyclohexane from UNIVAR, Inc. | 18.423 |
| benzoyl chloride | benzoyl chloride from Aldrich Chemical Co. | 0.055 |

To prepare Reactant Composition D, the Additive and the Lubricant are premixed and held at 50° C. The trimethylolpropane is loaded to the reactor followed by ethyl acetate. The IPDI is vacuum loaded to the reactor followed by the remainder of the ethyl acetate as a rinse. The batch is held at 70° C. for 4 hours. The batch is then cooled to 55° C. The viscosity of the batch is measured. If the viscosity is <380 cP, the viscosity of the batch is adjusted to >380 cP by adding trimethylolpropane. If the viscosity is >380 cP, or after the additional trimethylolpropane is added, the reactor is then cooled to 55° C. The premixed Additive/Lubricant is vacuum loaded to the reactor. The cyclohexane is then added to the reactor, and the contents are held at 45° C. and stirred 45 minutes until the contents are clear (e.g., Additive must be dissolved). The benzoyl chloride is then vacuum loaded to the reactor, and the contents are stirred for 15 minutes. Reactant Composition B is then packaged for use.

Reactant Composition A (from Example 1) and Reactant Composition D can be applied to a film and reacted (e.g., by a film converter) to form a polyurethane coating on the film. In general, one part Reactant Composition A is mixed with one part Reactant Composition D. The Compositions are mixed together to ensure homogeneity, and are applied onto a target film at a target coating weight. To achieve adequate dynamic viscosity, the target solids at application should be around 30%. The preferred coating technique is roll applied, either direct or reverse gravure, with or without a smoothing bar. Solvents are then removed by force dry, or air dry heated oven. The urethane reaction of Reactant Composition A and Reactant Composition D commences upon solvent removal. At a mix ratio of 1:1, the theoretical isocyanate index is ~1.4:1. For purposes of these examples, a polyurethane coating formed from Reactant Composition A and Reactant Composition D shall be referred to as PU Coating 3.

For these examples, two additional polyethylene films are prepared. PE Film 1 is a seven layer film having a nominal thickness of 177.8 microns and the following composition:

| Layer | Component(s) (Nominal Thickness) | Density (g/cm³) | $I_2$ (g/10 mins) | Peak Melting Temp. (° C.) |
|---|---|---|---|---|
| Top (G) | 95% HDPE 1% slip concentrate 4% anti-block concentrate (24.9 microns) | 0.958-0.965 | 0.7-1.0 | 134 |
| Intermediate (C/D/E/F) | HDPE (25.3 microns) | 0.958-0.965 | 0.7-1.0 | 134 |
| Intermediate (B) | 85% LLDPE 15% LDPE (24.9 microns) | 0.913-0.919 0.919-0.924 | 0.8-1.1 1.7-2.0 | 123 108 |
| Bottom (sealing) (A) | 95% Sealant LLDPE 1% slip concentrate 4% anti-block concentrate (26.7 microns) | 0.897-0.902 | 0.75-1.25 | 95 |

PE Film 2 is a seven layer film having a nominal thickness of 76.2 microns and the following composition:

| Layer | Component(s) (Nominal Thickness) | Density (g/cm³) | $I_2$ (g/10 mins) | Peak Melting Temp. (° C.) |
|---|---|---|---|---|
| Top (G) | 85% LDPE 15% LDPE 1% slip concentrate 4% anti-block concentrate (9.1 microns) | 0.913-0.918 0.919-0.924 | 0.8-1.1 1.7-2.0 | 123 108 |
| Intermediate | HDPE | 0.958-0.965 | 0.7-1.0 | 134 |
| (C/D/E/F) | (11.4 microns each) | | | |
| Intermediate (B) | 85% LLDPE 15% LDPE (9.9 microns) | 0.913-0.919 0.919-0.924 | 0.8-1.1 1.7-2.0 | 123 108 |
| Bottom (sealing) (A) | 95% Sealant LLDPE 1% slip concentrate 4% anti-block concentrate (11.4 microns) | 0.897-0.902 | 0.75-1.25 | 95 |

PE Film 1 and PE Film 2 are formed in the same manner as the film described in Example 1.

In addition, a homopolymer case polypropylene (CPP Film) is also evaluated. CPP Film has a nominal thickness of 114.3 microns and a density of 0.891-0.900 g/cm³.

Each of the films is coated with the polyurethane coating specified below to provide the following coated films which represent embodiments of the present invention:

| Sample | Film | Coating |
|---|---|---|
| Sample D | PE Film 1 | PU Coating 1 |
| Sample E | CPP Film | PU Coating 1 |
| Sample F | PE Film 2 | PU Coating 1 |
| Sample G | PE Film 2 | PU Coating 3 |
| Sample H | PE Film 2 | PU Coating 2 |

For each of the above samples, the amount of polyurethane coating applied is 3 grams per square meter.

The coefficients of friction (static and kinetic) are measured in accordance with ASTM 1894 for each of the above samples and compared to the coefficients of friction for the uncoated films. The results are as follows:

| | Coating to Steel | | Coating to Coating | |
|---|---|---|---|---|
| Sample | Static | Kinetic | Static | Kinetic |
| Uncoated PE Film 1 | 0.25 | 0.2 | 0.30 | 0.25 |
| Sample D | 0.345 | 0.378 | 0.359 | 0.331 |
| Uncoated CPP Film | 0.615 | 0.649 | 0.573 | 0.596 |
| Sample E | 0.45 | 0.441 | 0.512 | 0.513 |
| Uncoated PE Film 2 | 0.256 | 0.194 | 0.34 | 0.288 |
| Sample F | 0.437 | 0.512 | 0.691 | 0.661 |
| Sample G | 0.507 | 0.413 | 0.393 | 0.413 |
| Sample H | 0.564 | 0.683 | 0.649 | 0.661 |

In addition, the thermal resistances of some of these films are also measured according to the following W-fold test. The W-fold test folds a coated film in a "W" shape such that there are uncoated surface-to-uncoated surface and coated surface-to-coated surface interfaces. The folded film is placed into a Sencorp Sealing Machine set at 40 psi with a 2 second dwell time. The temperature is varied from low to high in order to assess the temperatures at which the uncoated surface-to-uncoated surface interface seals, but the coated surface-to-coated surface interface does not seal. A large temperature window between the temperature at which the uncoated surfaces seal and a higher temperature at which the seal between the coated surfaces fails is desired. The starting temperature is set at 230° F., held there for 2 seconds, and then increased in 10° F. until the coated surface-to-coated surface interface starts to mar. The thermal resistance according to the W-fold test is the highest temperature at which the coated surface-to-coated surface interface does not mar. The results are as follows:

| Sample | Maximum Heat Resistance (face-to-face exposure) |
| --- | --- |
| Sample E | 420° F. |
| Sample F | 410° F. |
| Sample G | 260° F. |
| Sample H | 420° F. |

That which is claimed is:

1. A coated film comprising:
   (a) a film comprising:
      (i) a first layer comprising from 70 to 100 percent by weight of a linear low density polyethylene having a density less than 0.930 g/cm$^3$ and a peak melting point of less than 126° C.;
      (ii) a second layer comprising from 60 to 100 percent by weight polyethylene having a density of 0.905 to 0.970 g/cm$^3$ and a peak melting point in the range of 100° C. to 135° C.; and
      (iii) at least one inner layer between the first layer and the second layer comprising from 70 to 100 percent by weight of a high density polyethylene having a density from 0.930 to 0.970 g/cm$^3$ and a peak melting point in the range of 120° C. to 135° C. and when the inner layer comprises less than 100 percent by weight of the high density polyethylene, the inner layer further comprises one or more additional polyethylenes; and
   (b) a coating on an outer surface of the second layer of the film comprising polyurethane,
   wherein the coated film has a gloss of at least 70 units at 60° and wherein any additional inner layer of the film comprises 100 percent by weight polyethylene.

2. The coated film of claim 1, wherein the coated film is thermally resistant under the sealing conditions of ASTM F1921-98 over a temperature range of 80° C. to 180° C.

3. The coated film according to claim 1, wherein the film is a blown film.

4. The coated film according to claim 1, wherein the amount of coating on the outer surface of the second layer of the film is 1 to 7 g/m$^2$.

5. The coated film according to claim 1, wherein the coated film has a coefficient of friction of 0.15 to 1.0 on the coated surface.

6. The coated film according to claim 1, wherein the polyurethane is formed from: (a) a hydroxyl terminated polyol or urethane; and (b) an isocyanate-functional prepolymer.

7. The coated film according to claim 6, wherein the isocyanate-functional prepolymer comprises an aromatic isocyanate.

8. The coated film according to claim 6, wherein the hydroxyl terminated urethane comprises at least one of a hydroxyl terminated polyether-based urethane, a hydroxyl terminated polyester-based urethane, and a hydroxyl terminated polyester-polyether-based urethane.

9. The coated film according to claim 1, wherein the film comprises one or more lower density inner layers between the first layer and the second layer comprising from 50 to 100 percent by weight polyethylene having a density of 0.92 g/cm$^3$ or less and a peak melting point in the range of 120° C. to 135° C.

10. The coated film according to claim 1, further comprising a barrier layer.

11. An article comprising the coated film according to claim 1.

12. The article according to claim 11, wherein the coated film has a thickness of 20 to 200 microns.

13. A coated film comprising:
   (a) a film comprising:
      (i) a first layer comprising from 70 to 100 percent by weight of a linear low density polyethylene having a density less than 0.930 g/cm$^3$ and a peak melting point of less than 126° C.;
      (ii) a second layer comprising from 60 to 100 percent by weight polyethylene having a density of 0.905 to 0.970 g/cm$^3$ and a peak melting point in the range of 100° C. to 135° C.; and
      (iii) at least one inner layer between the first layer and the second layer comprising from 70 to 100 percent by weight of a high density polyethylene having a density from 0.930 to 0.970 g/cm$^3$ and a peak melting point in the range of 120° C. to 135° C. and when the inner layer comprises less than 100 percent by weight of the high density polyethylene, the inner layer further comprises one or more additional polyethylenes; and
   (b) a coating on an outer surface of the second layer of the film comprising polyurethane, wherein the polyurethane wherein the polyurethane is formed from: (1) a hydroxyl terminated polyol or urethane; and (2) an isocyanate-functional prepolymer,
   wherein the coated film has a gloss of at least 70 units at 60° and wherein any additional inner layer of the film comprises 100 percent by weight polyethylene.

* * * * *